(12) United States Patent
Wu

(10) Patent No.: US 7,412,163 B2
(45) Date of Patent: Aug. 12, 2008

(54) CAMERA MODULE OF AN ELECTRONIC DEVICE

(75) Inventor: Wei-Ming Wu, Hsinchuang (TW)

(73) Assignee: Quanta Computer Inc., Tao Yuan Shien (TW)

( * ) Notice: Subject to any disclaimer, the term of this patent is extended or adjusted under 35 U.S.C. 154(b) by 378 days.

(21) Appl. No.: 11/396,717

(22) Filed: Apr. 4, 2006

(65) Prior Publication Data

US 2007/0140685 A1 Jun. 21, 2007

(30) Foreign Application Priority Data

Dec. 19, 2005 (TW) .............................. 94145097 A

(51) Int. Cl.
G03B 17/48 (2006.01)
E05D 7/00 (2006.01)
(52) U.S. Cl. ........................................ 396/429; 16/221
(58) Field of Classification Search ................. 396/429; 16/50, 221, 319, 348; 348/333.06; 455/575.1
See application file for complete search history.

(56) References Cited

U.S. PATENT DOCUMENTS

2005/0035912 A1 * 2/2005 Takagi ........................ 343/702
2006/0152614 A1 * 7/2006 Wang et al. ............. 348/333.06
2006/0238637 A1 * 10/2006 Goto et al. ............. 348/333.06

* cited by examiner

*Primary Examiner*—W. B. Perkey
*Assistant Examiner*—Minh Phan
(74) *Attorney, Agent, or Firm*—Rabin & Berdo, PC

(57) ABSTRACT

A camera module with a hinge mechanism is installed on an electronic device. The camera module housing has two hollow cylinder-shaped shafts at two opposite ends. Two hollow cylinder-shaped shafts are pivotally connected with the electronic device. A camera is disposed in the housing. A hinge portion is configured inside at least one of the two hollow cylinder-shaped shafts. Two ends of the hinge portion are first and second brackets, which are respectively secured to ground terminals of the camera module and the electronic device. A first cam is secured to the first bracket. A connection shaft, of which one end is secured to the second bracket, goes through a spring, through holes of a second cam, the first cam and the first bracket. When the housing rotates, interactions among the spring, the first cam and the second cam provide regional positioning and regional automatic rotation functionalities.

20 Claims, 8 Drawing Sheets

CAMERA MODULE OF AN ELECTRONIC DEVICE

RELATED APPLICATIONS

The present application is based on, and claims priority from, Taiwan Application Serial Number 94145097, filed on Dec. 19, 2005, the disclosure of which is hereby incorporated by reference herein in its entirety.

BACKGROUND

1. Field of Invention

The present invention relates to a camera module of an electronic device. More particularly, the present invention relates to a camera module with a hinge mechanism.

2. Description of Related Art

As the manufacturing of CMOS image sensors rapidly advances, they are being more widely used in camera modules on cell phones, notebook computers and PDAs.

In order to equip a CMOS camera module with rotational functionality, every portable electronic device supplier is demanding a hinge mechanism with a variety of specified functions.

SUMMARY

It is therefore an objective of the present invention to provide a hinge mechanism that equips a camera module with both regional positioning and regional automatic rotational functionalities.

It is another objective of the present invention to provide a hinge mechanism that equips a camera module with both EMI and RF shielding.

It is still another objective of the present invention to provide a hinge mechanism to equip a camera module with an automatically turned image on the flat panel display when the camera module switches between two opposite sides of the flat panel display.

In accordance with the foregoing and other objectives of the present invention, a camera module is installed on an electronic device. The housing of the camera module has two hollow cylinder-shaped shafts at two opposite ends. Two hollow cylinder-shaped shafts are pivotally connected with the electronic device. A camera is disposed in the housing. A hinge portion is configured inside at least one of the two hollow cylinder-shaped shafts. Two ends of the hinge portion are the first and second brackets, which are respectively secured to the ground terminals of the camera module and the electronic device. A first cam is secured to the first bracket. A connection shaft, of which one end is secured to the second bracket, goes through a spring, through holes of a second cam, the first cam and the first bracket. When the housing rotates, interactions among the spring, the first cam and the second cam provide regional positioning and regional automatic rotational functionalities. An arm portion is secured to an end of the first bracket. When the camera rotates and the switch thereof engages with the arm portion, the switch transmits a signal to turn the image upside down on the display screen.

The first cam and the second cam both have a surface, including a convex section, a concave section, a sliding section and a blank section, in contact each other. When the convex section of either the first cam or the second cam is in contact with the concave section or the blank section of the other cam, the camera module becomes stationary. When the convex section of either the first cam or the second cam is in contact with the sliding section of the other cam, the camera module can rotate automatically.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
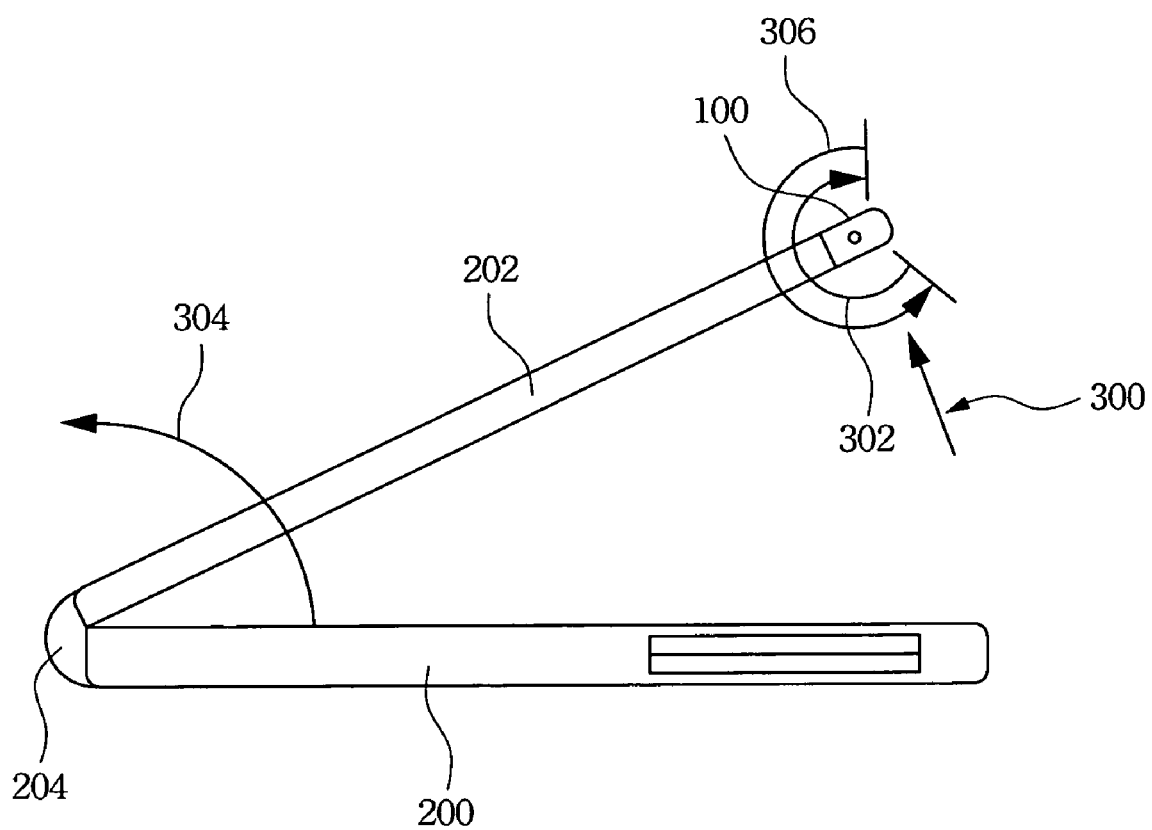
FIG. 1 illustrates a camera module installed in a notebook computer.

Reference will now be made in detail to the present preferred embodiments of the invention, examples of which are illustrated in the accompanying drawings. Wherever possible, the same reference numbers are used in the drawings and the description to refer to the same or like parts.

FIG. 1 illustrates a camera module installed in a notebook computer. A notebook computer includes a main body 200 and a flat panel display 202 (a screen). The flat panel display 202 is pivotally connected with the main body 200 by a hinge 204. A camera module 100 is installed at a top edge of the flat panel display 202. For a conventional camera module installed in the same or similar position, the camera module may be rotated but the flat panel display may not be rotated when a force is applied along the direction 300. In order to avoid such problems, a preferred embodiment of this invention restricts the camera module 100 to rotate along directions 302 or 306 within a limited range. Moreover, when the camera module 100 rotates along directions 302 or 306 and cannot obtain images but only the darkness inside the housing of the flat panel display 202, automatic regional rotation is provided.

Figure 2:
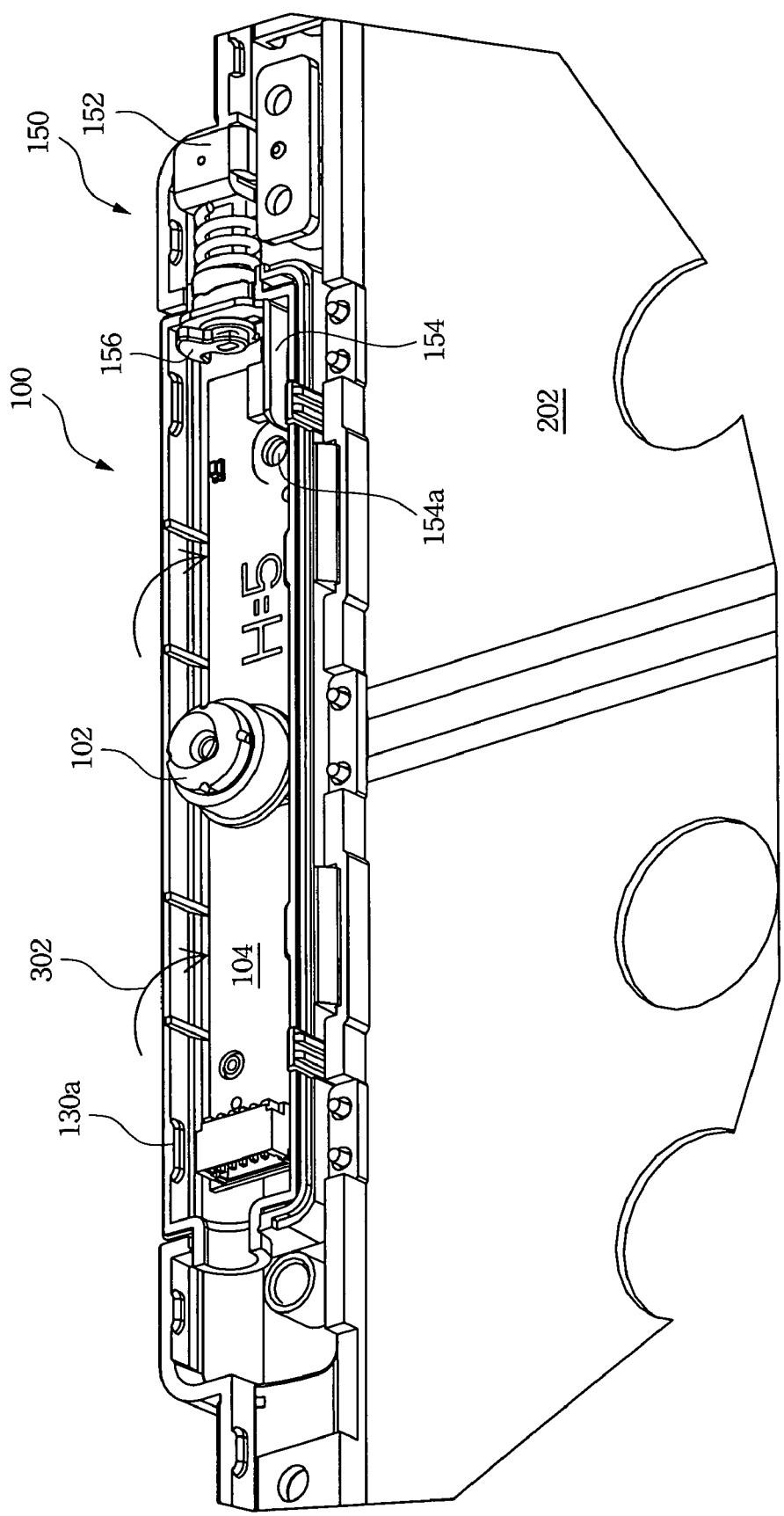
FIG. 2 illustrates a camera module with a hinge mechanism according to one preferred embodiment of this invention.

FIG. 2 illustrates a camera module with a hinge mechanism according to one preferred embodiment of this invention. Half of the housing has been removed to show the details inside the camera module 100. The housing (including the lower housing 130a and the upper housing) of the camera module 100 is pivotally connected with the flat panel display 202. A board portion 104 is disposed in the housing, and a camera 102 is mounted on the board portion 104. A hinge portion 150 pivotally connects the camera module 100 with the flat panel display 202. A bracket 154 of the hinge portion 150 is secured to a ground terminal of the board portion 104 (by the through hole 154a). A bracket 152 of the hinge portion 150 is secured to a ground terminal of the flat panel display 202. Therefore, the metal hinge portion 150 could link two ground terminals to equip the camera module 100 with EMI and RF shielding.

Figure 3:
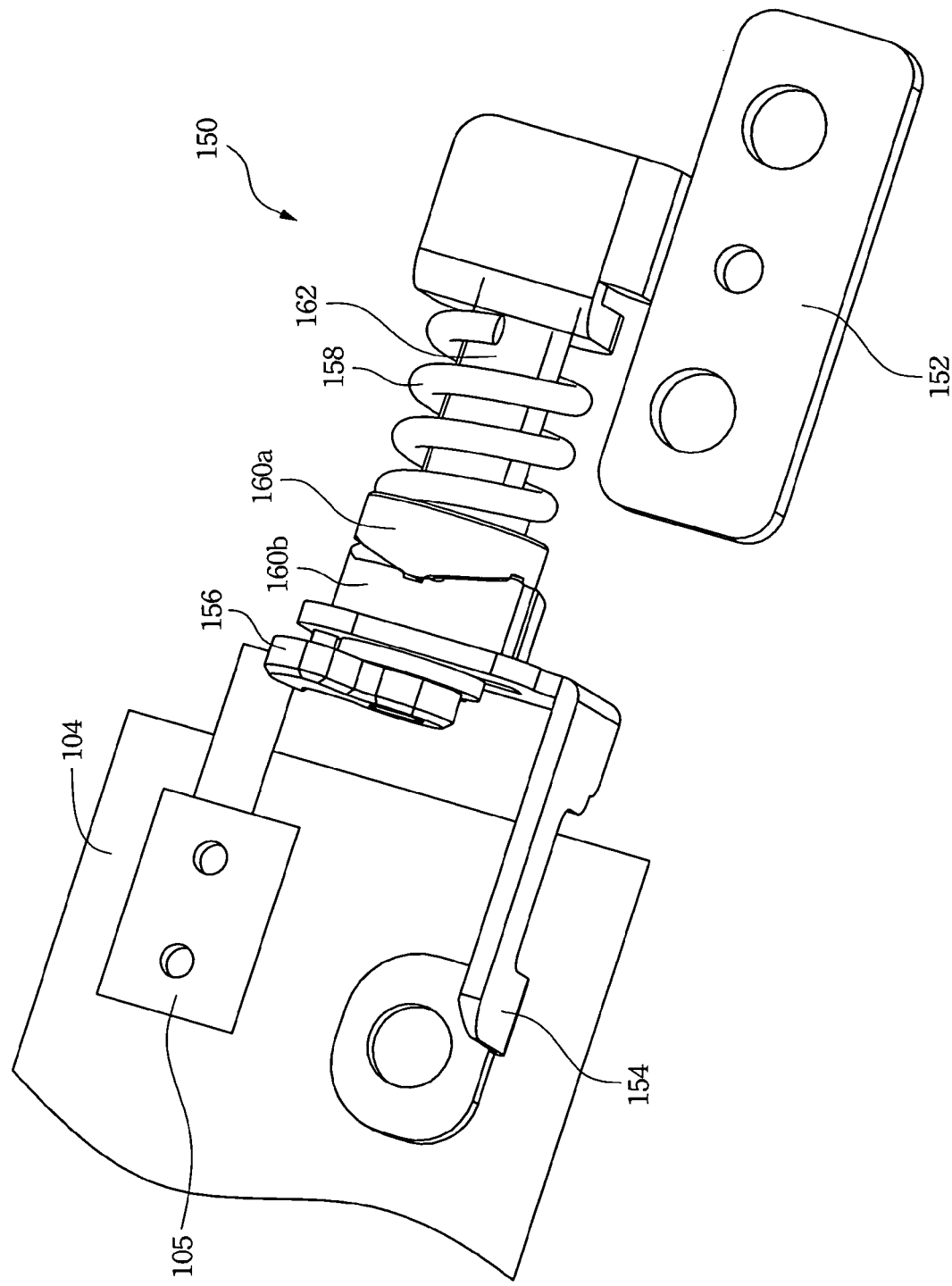
FIG. 3 illustrates the interaction between a hinge mechanism and a switch of the camera module according to one preferred embodiment of this invention.

FIG. 3 illustrates an interaction between a hinge mechanism and a switch of the camera module according to one preferred embodiment of this invention. Referring to FIG. 2 and FIG. 3, when the camera module 100 rotates, the board portion 104 in it rotates simultaneously so as to engage a switch 105 with an arm portion 156. The engaged switch 105 outputs a signal to turn an image, which is displayed on the flat panel display 202 and obtained by the camera module 100, upside down. Such functionality is utilized to turn the image upside down when the camera module 100 rotates to an opposite side of the flat panel display 202. This functionality turns the image upside down automatically without manual control.

Figure 4:
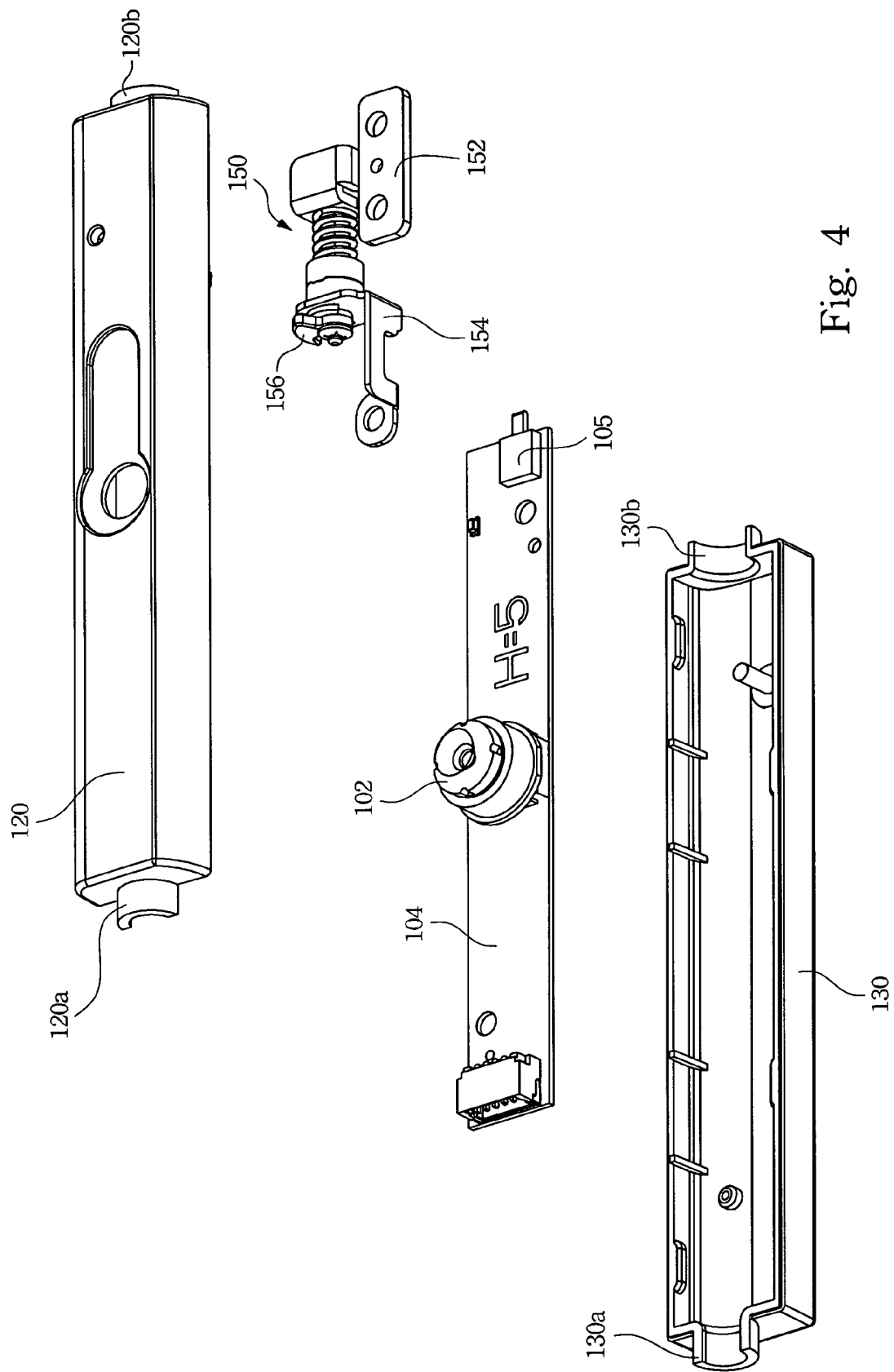
FIG. 4 illustrates an exploded view of a camera module according to one preferred embodiment of this invention.

FIG. 4 illustrates an exploded view of a camera module according to one preferred embodiment of this invention. The housing of the camera module 100 is divided into an upper housing 120 and a lower housing 130. Two opposite ends of the upper housing 120 and the lower housing 130 are combined to form two hollow cylinder-shaped shafts. For example, a hollow semi-cylinder shaft 120a and 130a are combined to form a hollow cylinder-shaped shaft. Two opposite ends of the camera module 100 housing are pivotally connected with the flat panel display 202, the camera module 100 can thus be rotated. The board portion 104 is disposed in the assembly of the upper housing 120 and the lower housing 130. The camera 102 and the switch 105 are disposed thereon. The hinge portion 150 goes through two (or one of two) hollow cylinder-shaped shafts of the camera module 100 housing so as to secure to the board potion 104 with the bracket 154 and to secure the camera 100 to the flat panel display 202 with the bracket 152.

Figure 5:
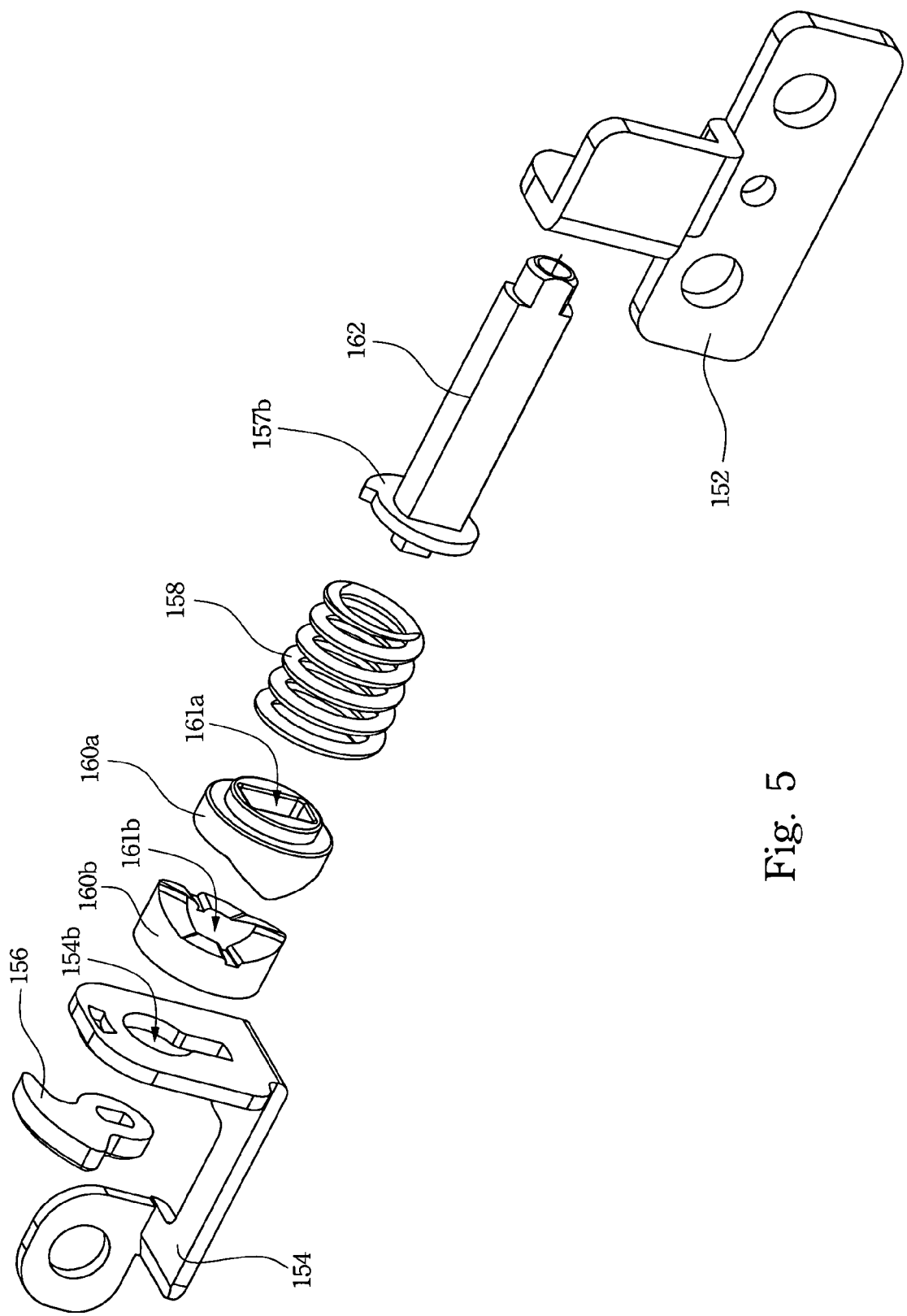
FIG. 5 illustrates an exploded view of a hinge mechanism according to one preferred embodiment of this invention.

FIG. 5 illustrates an exploded view of a hinge mechanism according to one preferred embodiment of this invention. Two ends of the hinge potion 150 are brackets 152 and 154, which are secured respectively to the camera module and the flat panel display. The arm potion 156 is used to engage with the switch 105 (illustrated in FIG. 4). A connection shaft 162 goes through the aligned through holes 154b (of the bracket 154), 161a (of a cam 160a) and 161b (of a cam 160b) to assemble them all.

Figure 6:
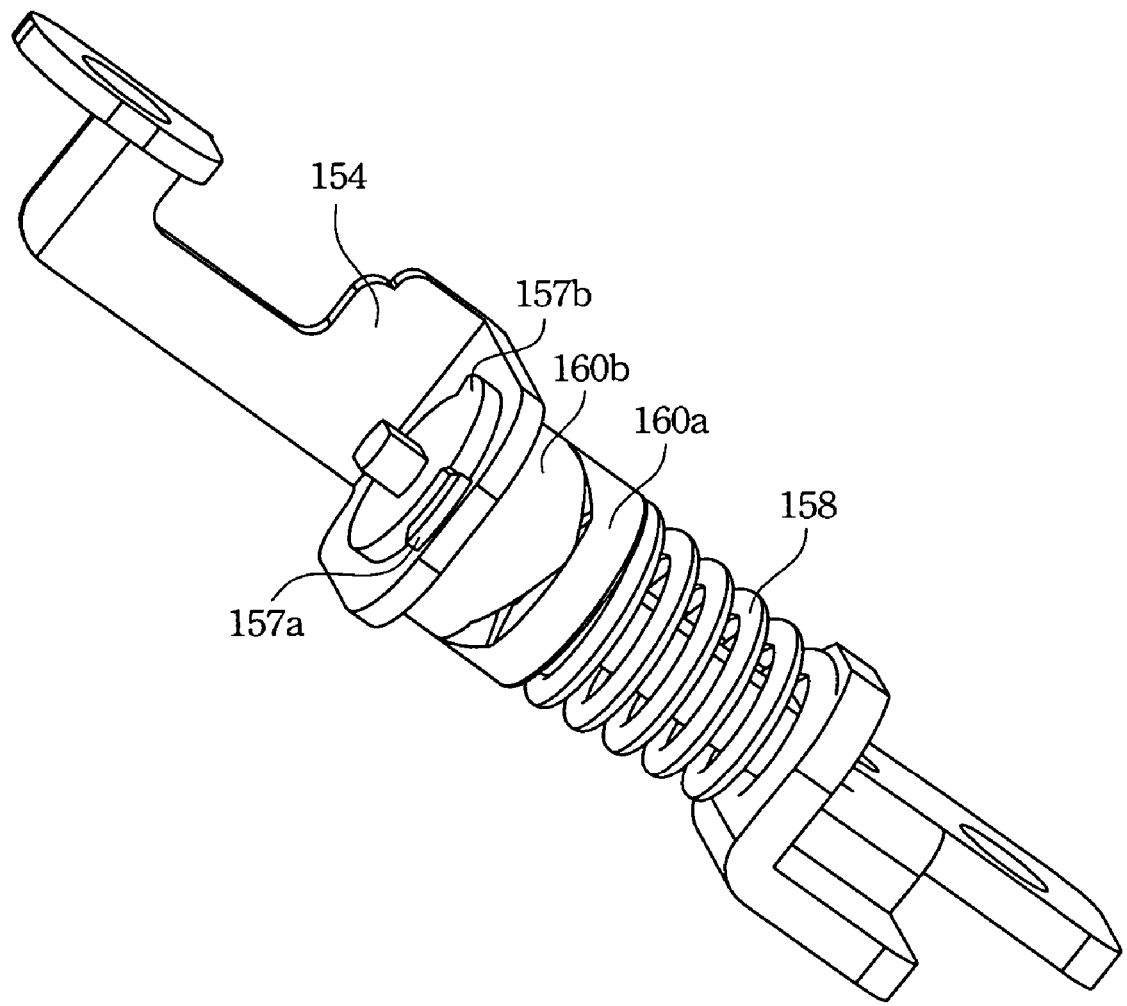
FIG. 6 illustrates how a hinge mechanism can be rotated within a range according to one preferred embodiment of this invention.

FIG. 6 illustrates how a hinge mechanism can be rotated within a range according to one preferred embodiment of this invention. A restrictor 157a of the bracket 154 restricts an end potion 157b of the connection shaft 162 such that the bracket 154 rotates within a limited range. Therefore, the camera module 100 also rotates within the same limited range.

Figure 7:
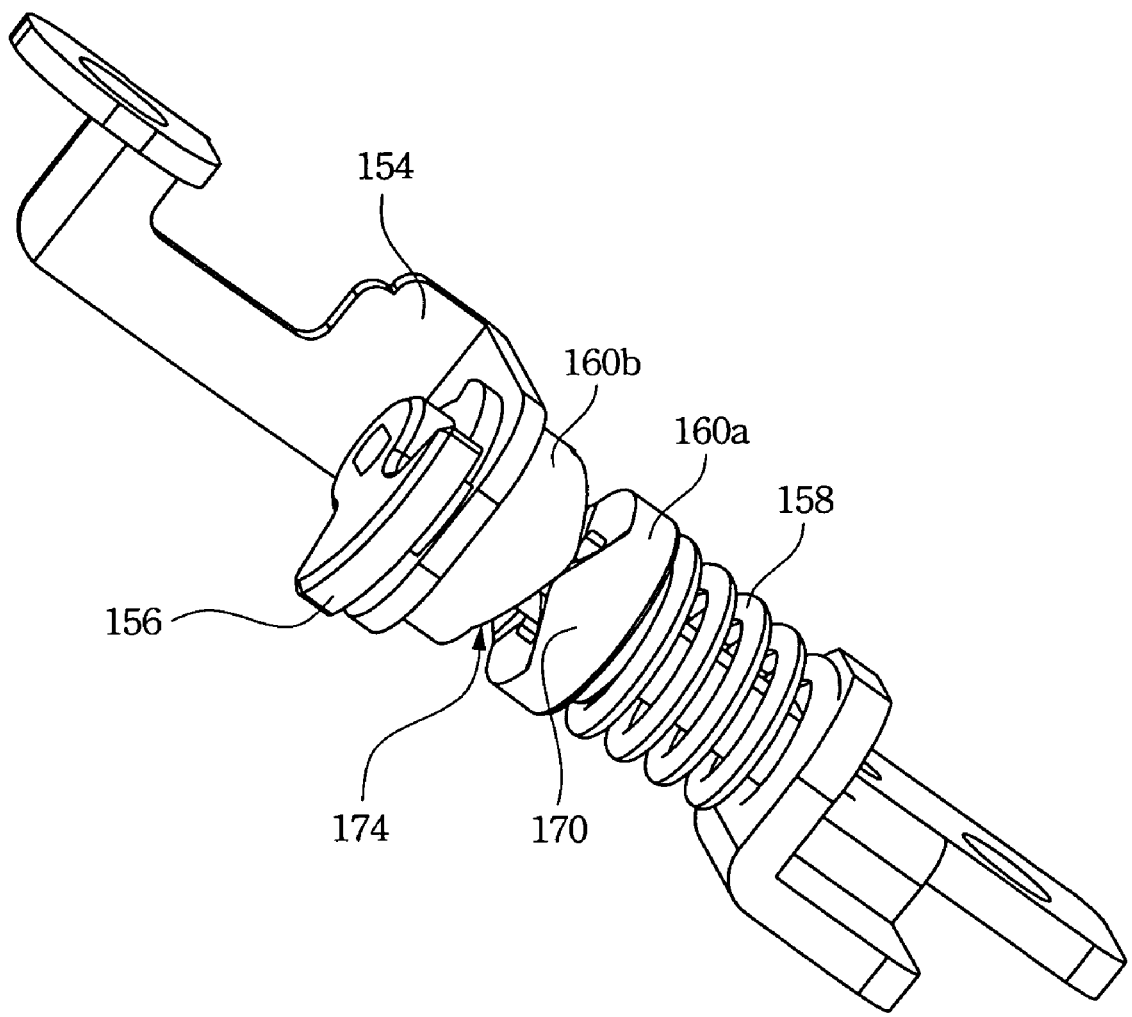
FIG. 7 illustrates how a regional automatic rotation functionality of a hinge mechanism works according to one preferred embodiment of this invention.
Figure 8:
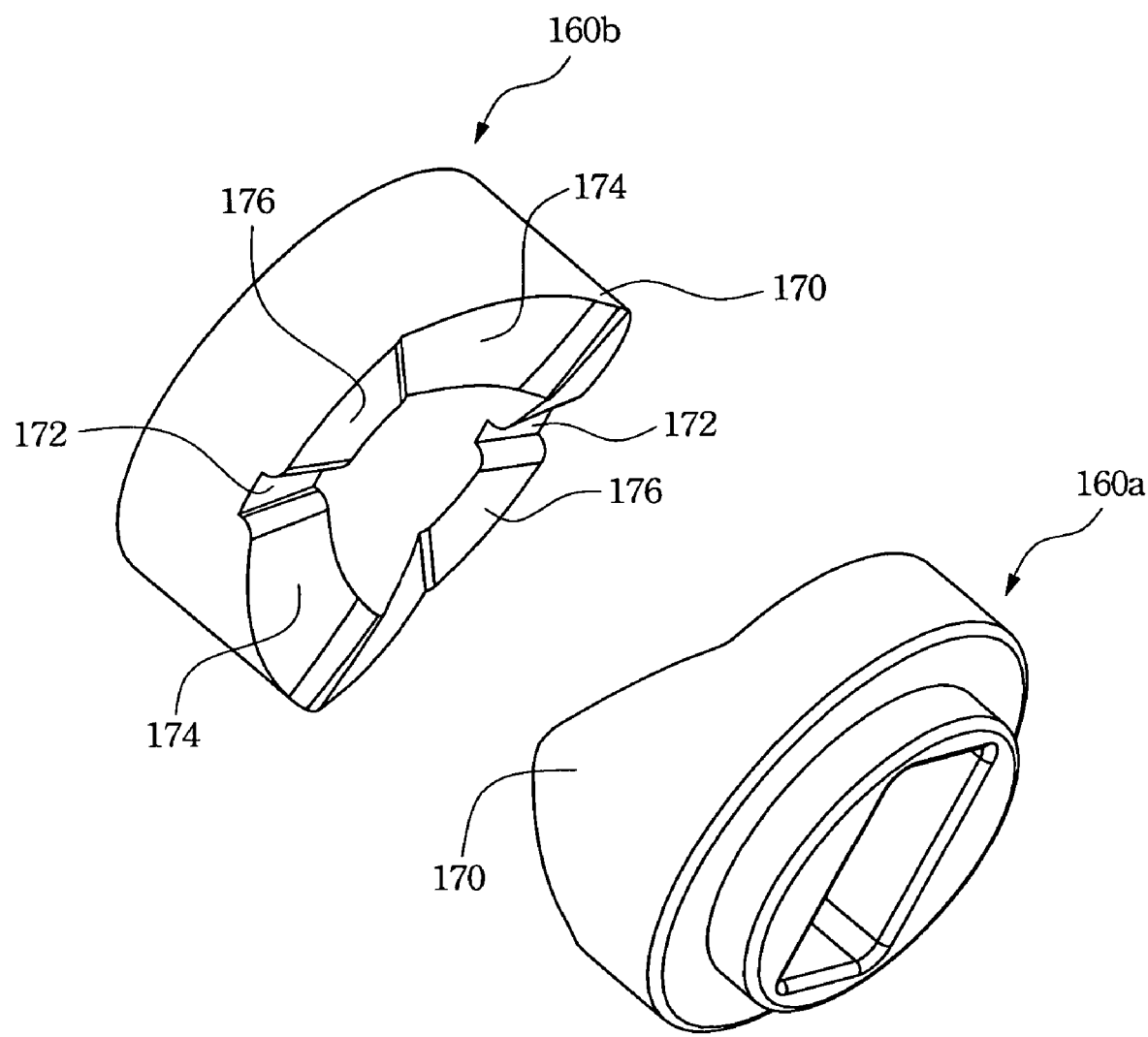
FIG. 8 illustrates a detailed view of two cams of a hinge mechanism according to one preferred embodiment of this invention.

Referring to FIG. 7 and FIG. 8, a contact surface between cams 160a and 160b are designed to provide regional positioning and regional automatic rotation functionalities. For instance, a convex section 170, a concave section 172, a sliding section 174 and a blank section 176 are designed on both contact surfaces of the cams 160a and 160b. When the convex section 170 of cam 160a is in contact with the concave section 172 or the blank section 176 of cam 160b (or the convex section 170 of cam 160b is in contact with the concave section 172 or the blank section 176 of cam 160a), the camera module 100 is stationary. When the convex section 170 of cam 160a is in contact with the sliding section 174 of the other cam 160b (the convex section 170 of the cam 160b contacts the sliding section 174 of the cam 160a), a spring 158 pushes the cam 160a such that the camera module 100 can rotate automatically. However, the convex section 170 in contact with the concave section 172 provides more reliable positioning than when the convex section 170 is in contact with the blank section 176.

According to preferred embodiments of the present invention, the camera module provides a regional positioning and a regional automatic rotation. Two opposite ends of the metal-blade hinge portion are respectively secured to ground terminals of the camera module and electronic device so as to equip the camera module with EMI and RF shielding. When the camera module switches between two opposite sides of the flat panel display, an image displayed on the flat panel display is turned upside down automatically.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A camera module installed on an electronic device, the camera module comprising:
   a housing, having two hollow cylinder-shaped shafts at two opposite ends, the two hollow cylinder-shaped shafts being pivotally connected with the electronic device;
   a camera, disposed in the housing; and
   a hinge portion, configured inside at least one of the two hollow cylinder-shaped shafts, the hinge portion comprising:
      a first bracket, connected with the housing at one end;
      a first cam, fixed on the first bracket, wherein a first through hole goes through the first cam and the first bracket, and the housing, the first bracket and the first cam can rotate simultaneously;
      a second cam, having a second through hole;
      a spring;
      a second bracket, connected with the electronic device at one end; and
      a connection shaft, secured to the second bracket, wherein the connection shaft goes through the spring, the second cam via the second through hole, the first cam and the first bracket via the first through hole successively so as to restrict all thereof within a predetermined distance, when the housing rotates in relation to the electronic device, interactions among the spring, the first cam and the second cam equip the housing with regional positioning and regional automatic rotation functionalities.

2. The camera module of claim 1, wherein the first cam and the second cam both have a surface, including a convex section, a concave section, a sliding section and a blank section, to contact each other.

3. The camera module of claim 2, wherein the housing is stationary when the convex section of the first cam contacts the concave section or the blank section of the second cam.

4. The camera module of claim 2, wherein the housing is stationary when the convex section of the second cam contacts the concave section or the blank section of the first cam.

5. The camera module of claim 2, wherein the housing can rotate automatically when the convex section of the first cam contacts the sliding section of the second cam.

6. The camera module of claim 2, wherein the housing can rotate automatically when the convex section of the second cam contacts the sliding section of the first cam.

7. The camera module of claim 1, wherein the first bracket further comprises a restrictor to limit the connection shaft to rotate within a range.

8. A camera module installed on an electronic device, the camera module comprising:
   a housing, having two hollow cylinder-shaped shafts at two opposite ends, the two hollow cylinder-shaped shafts being pivotally connected with the electronic device;
   a board portion, having a camera thereon and disposed inside the housing; and
   a metal hinge portion, configured inside at least one of the two hollow cylinder-shaped shafts, the hinge portion comprising:
      a first bracket, connected with the housing at one end;
      a first cam, fixed on the first bracket, wherein a first through hole goes through the first cam and the first bracket, and the housing, the first bracket and the first cam can rotate simultaneously;
      a second cam, having a second through hole;
      a spring;
      a second bracket, connected with the electronic device at one end; and
      a connection shaft, secured to the second bracket, wherein the connection shaft goes through the spring, the second cam via the second through hole, the first cam and the first bracket via the first through hole successively so as to restrict all thereof within a predetermined distance, when the housing rotates in relation to the electronic device, interactions among the spring, the first cam and the second cam equipping the housing with regional positioning and regional automatic rotation functionalities.

9. The camera module of claim 8, wherein the first cam and the second cam both have a surface, including a convex section, a concave section, a sliding section and a blank section, to contact each other.

10. The camera module of claim 9, wherein the housing is stationary when the convex section of the first cam is in contact with the concave section or the blank section of the second cam.

11. The camera module of claim 9, wherein the housing is stationary when the convex section of the second cam is in contact with the concave section or the blank section of the first cam.

12. The camera module of claim 9, wherein the housing can rotate automatically when the convex section of the first cam is in contact with the sliding section of the second cam.

13. The camera module of claim 9, wherein the housing can rotate automatically when the convex section of the second cam contacts the sliding section of the first cam.

14. The camera module of claim 8, wherein the first bracket further comprises a restrictor to limit the connection shaft to rotate within a range.

15. A camera module installed on an electronic device, the camera module comprising:
   a housing, having two hollow cylinder-shaped shafts at two opposite ends, the two hollow cylinder-shaped shafts being pivotally connected with the electronic device;
   a board portion, having a camera and a switch thereon and disposed inside the housing, an image obtained by the camera being transmitted to a display screen; and
   a hinge portion, configured inside at least one of the two hollow cylinder-shaped shafts, the hinge portion comprising:
      a first bracket, connected with the housing at one end;
      a first cam, fixed on the first bracket, wherein a first through hole goes through the first cam and the first bracket, and the housing, the first bracket and the first cam can rotate simultaneously;
      a second cam, having a second through hole;
      a spring;
      a second bracket, connected with the electronic device at one end;
      a connection shaft, secured to the second bracket, wherein the connection shaft goes through the spring, the second cam via the second through hole, the first cam and the first bracket via the first through hole successively so as to restrict all thereof within a predetermined distance, when the housing rotates in relation to the electronic device, interactions among the spring, the first cam and the second cam equip the housing with regional positioning and regional automatic rotation functionalities; and
      an arm portion, secured to an opposite end of the first bracket, when the housing rotates and the switch thereof engages with the arm portion, the switch outputs a signal to turn the image upside down on the display screen.

16. The camera module of claim 15, wherein the first cam and the second cam both have a surface, including a convex section, a concave section, a sliding section and a blank section, so as to be able to interact each other.

17. The camera module of claim 16, wherein the housing is stationary when the convex section of the first cam is in contact with the concave section or the blank section of the second cam.

18. The camera module of claim 16, wherein the housing is stationary when the convex section of the second cam is in contact with the concave section or the blank section of the first cam.

19. The camera module of claim 16, wherein the housing can rotate automatically when the convex section of the first cam is in contact with the sliding section of the second cam.

20. The camera module of claim 16, wherein the housing can rotate automatically when the convex section of the second cam contacts the sliding section of the first cam.

* * * * *